US012566788B2

(12) United States Patent
John et al.

(10) Patent No.: US 12,566,788 B2
(45) Date of Patent: Mar. 3, 2026

(54) CONVERSATION GRAPHS

(71) Applicant: Everlaw, Inc., Oakland, CA (US)

(72) Inventors: Mathew John, Newark, CA (US);
Joseph Kijewski, Berkeley, CA (US);
James Feng, Berkeley, CA (US)

(73) Assignee: Everlaw, Inc., Oakland, CA (US)

( * ) Notice: Subject to any disclaimer, the term of this
patent is extended or adjusted under 35
U.S.C. 154(b) by 0 days.

(21) Appl. No.: 18/326,020

(22) Filed: May 31, 2023

(65) Prior Publication Data

US 2024/0403348 A1 Dec. 5, 2024

(51) Int. Cl.
*G06F 16/35* (2025.01)
*G06F 16/358* (2025.01)
*G06F 16/383* (2019.01)

(52) U.S. Cl.
CPC .......... *G06F 16/358* (2019.01); *G06F 16/383*
(2019.01)

(58) Field of Classification Search
None
See application file for complete search history.

(56) References Cited

U.S. PATENT DOCUMENTS

| | | | |
|---|---|---|---|
| 2016/0269554 A1* | 9/2016 | Cecchi .................... | G06F 40/30 |
| 2020/0105255 A1* | 4/2020 | Huang ................ | G06F 16/3334 |
| 2020/0218989 A1* | 7/2020 | Mei ........................... | G06N 5/02 |
| 2021/0097140 A1* | 4/2021 | Chatterjee .............. | G06N 5/022 |
| 2021/0273899 A1* | 9/2021 | Bastide .................. | G06N 20/00 |
| 2023/0252085 A1* | 8/2023 | Misra .................. | G06F 16/9038 |
| | | | 707/723 |

* cited by examiner

*Primary Examiner* — Augustine K. Obisesan
(74) *Attorney, Agent, or Firm* — Banner & Witcoff, Ltd.

(57) ABSTRACT

Conversation graphing capabilities accommodate subsets of
conversations to be examined or reviewed. An "others" node
is included in a conversation graph displayed through a user
interface representing, in one implementation, all conversa-
tions not shown on the graph. Individual nodes and/or edges
can be selected regardless of whether they are adjacent or
connected. Information related to the communications asso-
ciated with the selected nodes and/or edges is displayed.
Nodes associated with communications falling within a
selected time range is included and emphasized in the
conversation graph. Directionality (i.e., direction of majority
of communications) and/or proportionality (i.e., fraction of
communications flowing in one direction along an edge
verses the opposite direction) is provided through a visual
indication for individual edges in the conversation graph.

21 Claims, 11 Drawing Sheets

Others
Node
108

User
Interface
100

Others ⓘ
Total Docs
81785
Selected
11718

Node
104

Conv
Graph
102

James D
Stet

Visual
Indication
118

Position
120

Edge
106

Steve
Kean

Jeff
Dasovich

Kay
Martin

Node
104

Vince J
Kami

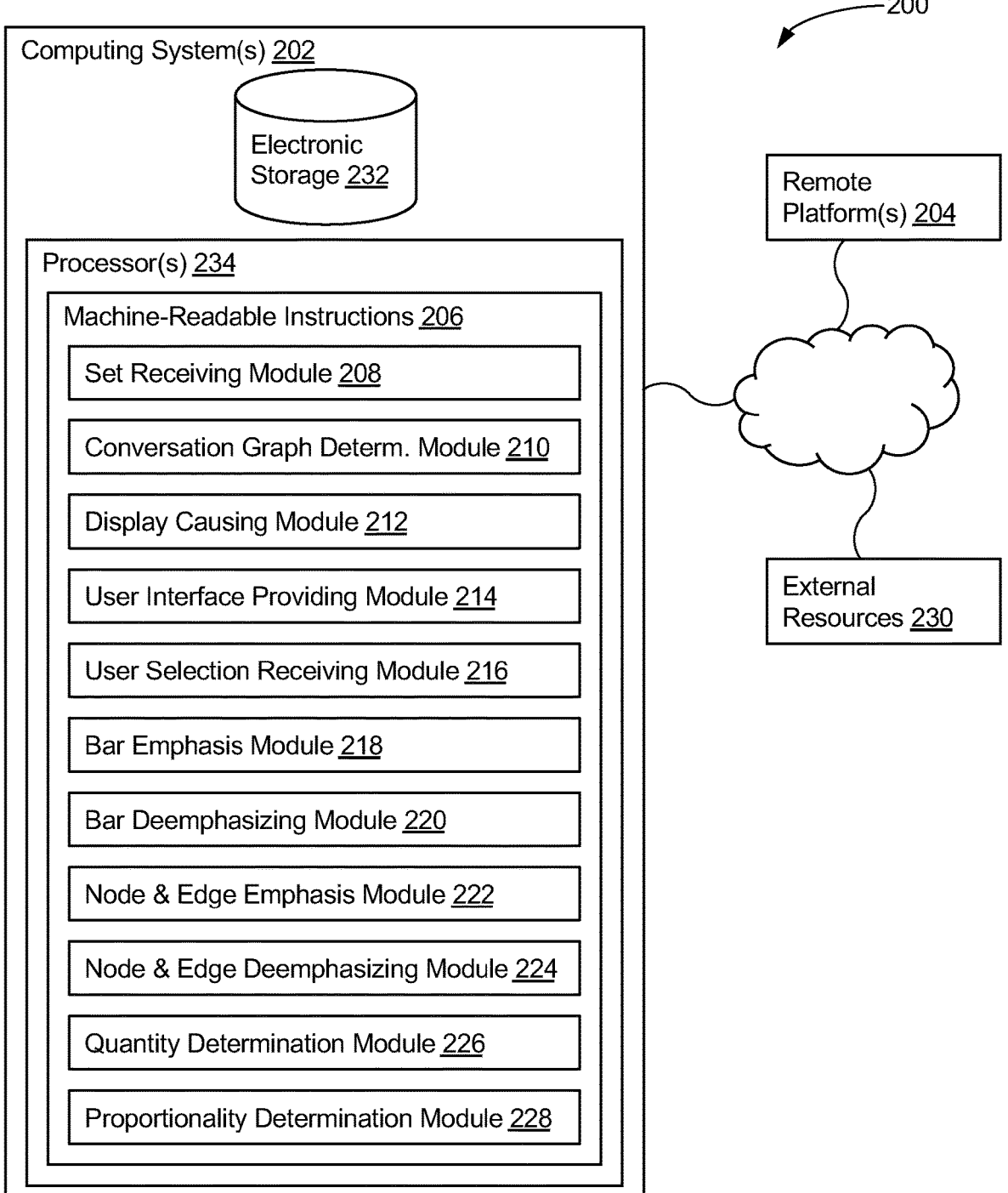

200

Computing System(s) 202

Electronic Storage 232

Processor(s) 234

Machine-Readable Instructions 206

Set Receiving Module 208

Conversation Graph Determ. Module 210

Display Causing Module 212

User Interface Providing Module 214

User Selection Receiving Module 216

Bar Emphasis Module 218

Bar Deemphasizing Module 220

Node & Edge Emphasis Module 222

Node & Edge Deemphasizing Module 224

Quantity Determination Module 226

Proportionality Determination Module 228

Remote Platform(s) 204

External Resources 230

402
Receive, By Processor, Set Of Communications

404
Determine, By Processor, Conversation Graph Representing Conversations Within Set Of Communications 406
Cause Display Of Conversation Graph Through User Interface

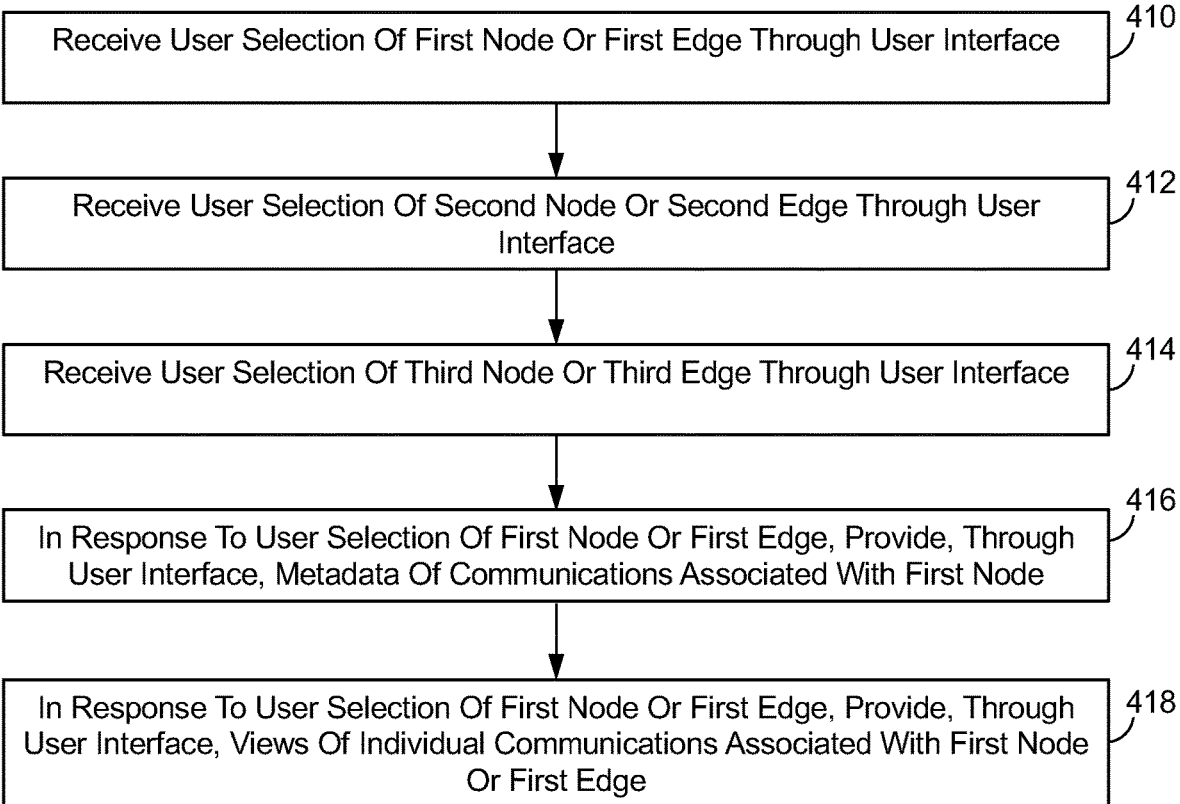

Provide, Through User Interface, Others Node Connected To One Or More Other Nodes In Conversation Graph — 408

FIG. 4B

Receive User Selection Of First Node Or First Edge Through User Interface — 410

Receive User Selection Of Second Node Or Second Edge Through User Interface — 412

Receive User Selection Of Third Node Or Third Edge Through User Interface — 414

In Response To User Selection Of First Node Or First Edge, Provide, Through User Interface, Metadata Of Communications Associated With First Node — 416

In Response To User Selection Of First Node Or First Edge, Provide, Through User Interface, Views Of Individual Communications Associated With First Node Or First Edge — 418

FIG. 4C

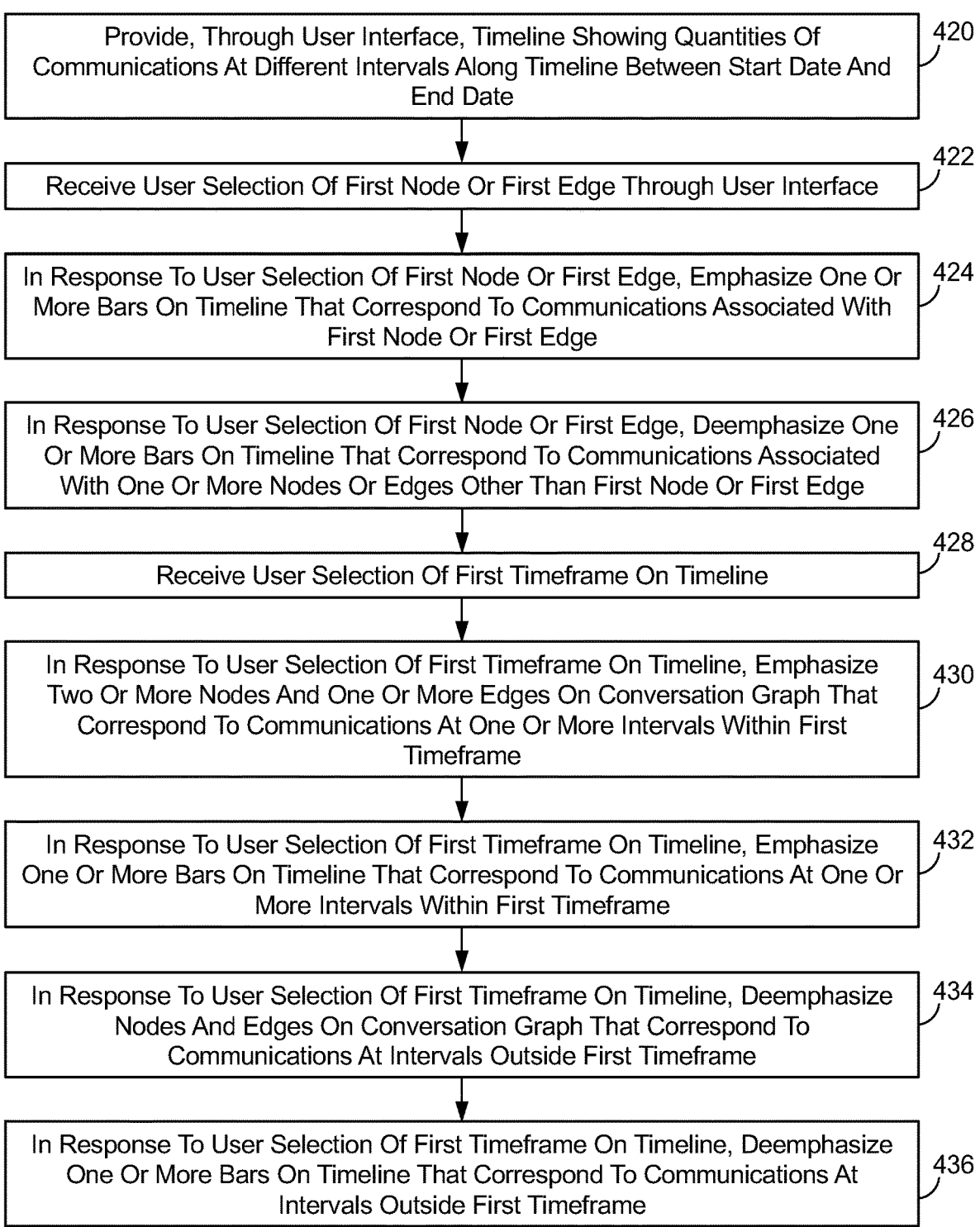

Provide, Through User Interface, Timeline Showing Quantities Of Communications At Different Intervals Along Timeline Between Start Date And End Date ⌐420

Receive User Selection Of First Node Or First Edge Through User Interface ⌐422

In Response To User Selection Of First Node Or First Edge, Emphasize One Or More Bars On Timeline That Correspond To Communications Associated With First Node Or First Edge ⌐424

In Response To User Selection Of First Node Or First Edge, Deemphasize One Or More Bars On Timeline That Correspond To Communications Associated With One Or More Nodes Or Edges Other Than First Node Or First Edge ⌐426

Receive User Selection Of First Timeframe On Timeline ⌐428

In Response To User Selection Of First Timeframe On Timeline, Emphasize Two Or More Nodes And One Or More Edges On Conversation Graph That Correspond To Communications At One Or More Intervals Within First Timeframe ⌐430

In Response To User Selection Of First Timeframe On Timeline, Emphasize One Or More Bars On Timeline That Correspond To Communications At One Or More Intervals Within First Timeframe ⌐432

In Response To User Selection Of First Timeframe On Timeline, Deemphasize Nodes And Edges On Conversation Graph That Correspond To Communications At Intervals Outside First Timeframe ⌐434

In Response To User Selection Of First Timeframe On Timeline, Deemphasize One Or More Bars On Timeline That Correspond To Communications At Intervals Outside First Timeframe ⌐436

FIG. 4D

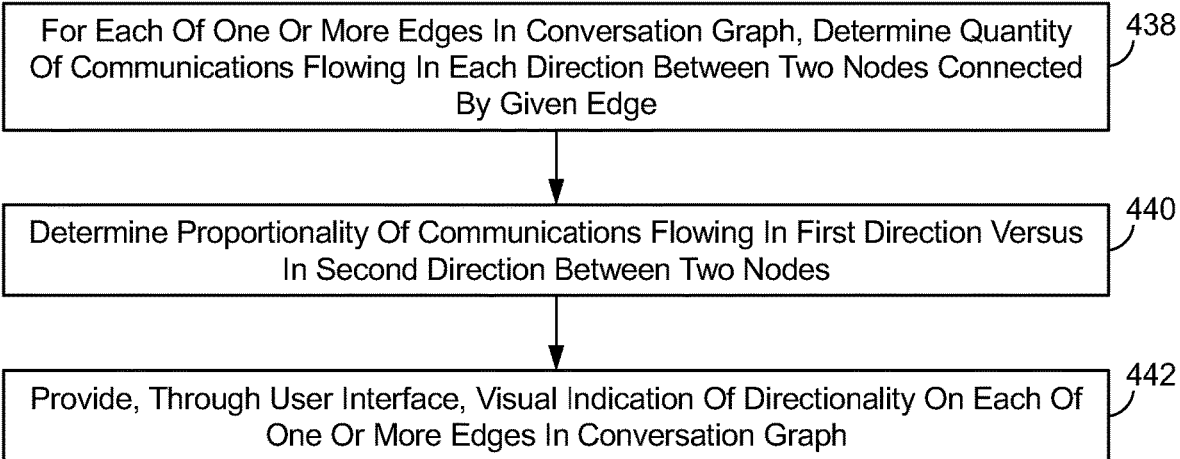

For Each Of One Or More Edges In Conversation Graph, Determine Quantity Of Communications Flowing In Each Direction Between Two Nodes Connected By Given Edge  — 438

Determine Proportionality Of Communications Flowing In First Direction Versus In Second Direction Between Two Nodes — 440

Provide, Through User Interface, Visual Indication Of Directionality On Each Of One Or More Edges In Conversation Graph — 442

FIG. 4E

CONVERSATION GRAPHS

FIELD OF THE DISCLOSURE

The present disclosure relates to methods, computing systems, and storage media for providing conversation graphs.

BACKGROUND

In the context of legal proceedings, for example, document review (or "doc" review) describes a process by which a party to a legal case analyzes documents in their possession (e.g., possessed before the case or obtained through discovery) to determine which documents are relevant to the case or otherwise sensitive (e.g., privileged). Document review is often performed by attorneys for their clients. It can also be used in the context of investigations. Routinely, communications (e.g., email messages, text messages, etc.) make up a large fraction (e.g., one-half or two-thirds) of the documents under review. In many cases, communications in relevant conversations are ultimately used as evidence.

Using conversation graphs is one technique to help visualize, navigate, and explore various communications. Generally, a conversation graph includes a graph-based representation of dialogues. Nodes in the conversation graph represent different entities (e.g., people, businesses, individual communications, etc.) while edges connecting the nodes represent a flow of communications between the entities.

With conventional conversation graphs, all communications in a set under analysis are simultaneously represented through nodes and edges. Conventional systems have limited ways of representing data in conversations and individual communications and cannot efficiently represent aspects of subsets of the data. For example, conventional systems typically include non-important communications within conversation graphs requiring significant processing power and memory to find relevant communications. Exacerbating this, document reviews in legal proceedings are growing in average size each year and often have many millions of communications to process in relation to hundreds or thousands of different entities.

SUMMARY

One aspect of the present disclosure relates to a method in a data processing system for providing conversation graphs. The method includes receiving, by a processor, a set of communications. The method includes determining, by the processor, a conversation graph representing conversations within the set of communications. The conversation graph includes two or more nodes and one or more edges connecting pairs of the two or more nodes. A given node represents an entity. The entity indicating one or more of a person, a specific communication, a domain name. A given edge connecting a given pair of nodes represents a flow of communication between the given pair of nodes. The method includes causing display of the conversation graph through a user interface. The method includes providing, through the user interface, an others node connected to one or more other nodes in the conversation graph. The others node represents the communications of all of the nodes not displayed through the user interface.

Another aspect of the present disclosure relates to a computing system configured for providing conversation graphs. The computing system includes a memory comprising executable instructions embodied thereon. The computing system includes one or more hardware processors configured to execute the instructions. The processor(s) executes the instructions to receive, by a processor, a set of communications. The processor(s) executes the instructions to determine, by the processor, a conversation graph representing conversations within the set of communications. The conversation graph includes two or more nodes and one or more edges connecting pairs of the two or more nodes. A given node represents an entity. The entity indicating one or more of a person, a specific communication, or a domain name. A given edge connecting a given pair of nodes represents a flow of communication between the given pair of nodes. The processor(s) executes the instructions to cause display of the conversation graph through a user interface. The processor(s) executes the instructions to provide, through the user interface, an "others node" (as referenced in more detail below) connected to one or more other nodes in the conversation graph. The others node represents the communications of all of the nodes not displayed through the user interface.

Yet another aspect of the present disclosure relates to a method in a data processing system for providing conversation graphs. The method includes receiving, by a processor, a set of communications. The method includes determining, by the processor, a conversation graph representing conversations within the set of communications. The conversation graph includes two or more nodes and one or more edges connecting pairs of the two or more nodes. A given node represents an entity. The entity indicating one or more of a person, a specific communication, or a domain name. A given edge connecting a given pair of nodes represents a flow of communication between the given pair of nodes. The method includes causing display of the conversation graph through a user interface. The method includes receiving a user selection of a first node or a first edge through the user interface. The method includes receiving a user selection of a second node or a second edge through the user interface. The second node or second edge and the first node or first edge are associated with different communications. The second node or the second edge is nonadjacent to the first node or the first edge.

Still another aspect of the present disclosure relates to a computing system configured for providing conversation graphs. The computing system includes a memory comprising executable instructions embodied thereon. The computing system includes one or more hardware processors configured to execute the instructions. The processor(s) executes the instructions to receive, by a processor, a set of communications. The processor(s) executes the instructions to determine, by the processor, a conversation graph representing conversations within the set of communications. The conversation graph includes two or more nodes and one or more edges connecting pairs of the two or more nodes. A given node represents an entity. The entity indicating one or more of a person, a specific communication, or a domain name. A given edge connecting a given pair of nodes represents a flow of communication between the given pair of nodes. The processor(s) executes the instructions to cause display of the conversation graph through a user interface. The processor(s) executes the instructions to receive a user selection of a first node or a first edge through the user interface. The processor(s) executes the instructions to receive a user selection of a second node or a second edge through the user interface. The second node or second edge and the first node or first edge are associated with different communications. The second node or the second edge is nonadjacent to the first node or the first edge.

BRIEF DESCRIPTION OF THE DRAWINGS

FIG. 2 illustrates a system configured for providing conversation graphs, in accordance with one or more implementations.

FIG. 4B shows one or more additional steps corresponding to the steps shown in FIG. 4A, in which an others node is provided, in accordance with one or more implementations.

FIG. 4C shows one or more additional steps corresponding to the steps shown in FIG. 4A, in which node selection is performed, in accordance with one or more implementations.

FIG. 4D shows one or more additional steps corresponding to the steps shown in FIG. 4A, in which time range selection is performed, in accordance with one or more implementations.

FIG. 4E shows additional one or more steps corresponding to the steps shown in FIG. 4A, in which node directionality is provided, in accordance with one or more implementations.

DETAILED DESCRIPTION

Figure 1A:
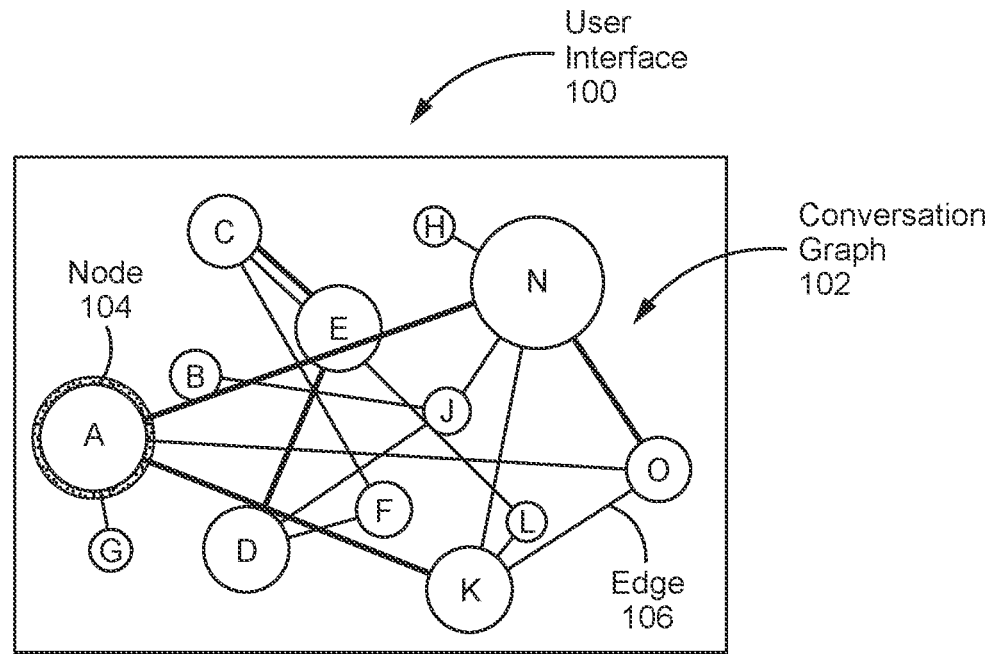
FIG. 1A illustrates an example view of a user interface showing a conversation graph, in accordance with one or more implementations.

Implementations described herein provide conversation graphing capabilities that accommodate subsets of conversations to be examined or reviewed. For example, in some implementations, an "others node" is included in a conversation graph displayed through a user interface. As used herein, the term "others node" refers to a displayed node in the conversation graph for other communications that are not being displayed by the various nodes and connecting edges in the graph. For example, the conversation graph may show twenty nodes of individual entities that are connected by various edges and then a single others node (i.e., the "others node") indicative of a collection of other communications from numerous other entities not included in the twenty nodes. The others node is connected to one or more other nodes and represents all entities associated with the communications and also meet some additional criteria, e.g., not having a corresponding node displayed through the user interface, having less than a threshold number of communications associated with them individually, or other criteria. As a result, communications of only certain entities can be examined without the clutter, and the computation costs of having all entities represented in the conversation graph regardless of their role in conversations being graphed is smaller and relatively less significant.

In some implementations, individual nodes and/or edges can be selected regardless of whether they are adjacent or connected. Information related to the communications associated with the selected nodes and/or edges is displayed. Selecting non-adjacent or non-connected nodes and/or edges can be used to show additional information about the documents selected (e.g., number of documents, details of the documents, lists of the documents to be able to click one, etc.), manipulate the specific documents selected, and/or other actions. Conventional systems lack such flexibility in selecting non-adjacent or non-connected nodes and/or edges and the accompanying functionality, which, as mentioned above, leads to additional processing cycles necessitating costly processing resources and memory.

In some implementations, nodes associated with communications falling within a selected time range are included and emphasized in the conversation graph. A timeline is also displayed showing the time range of the "others node" in addition to the time range of the displayed nodes (e.g., top 50 nodes). Conventional systems lack functionality allowing a time range to be specified on an others node in addition to a time range on the displayed nodes.

In some implementations, directionality (i.e., the direction of the majority of communications) and/or proportionality (i.e., the fraction of communications flowing in one direction along an edge versus the opposite direction) are provided through a visual indication for individual edges in the conversation graph. Conventional systems lack such indications of communication directionality/proportionality on their conversation graphs.

The disclosed implementations dramatically reduce the processing and memory resources needed to process all conversations in a large set (e.g., thousands or millions) by allowing users to examine only a subset of interest. For example, in some implementations, the processing is cut down because the highest-volume communication paths are shown and the lower-volume ones are grouped into the others node. As such, the disclosed subject implementations and examples provide improvements to the functioning of the computer itself because it improves processing and efficiency in conversation graphing.

FIG. 1A illustrates an example view of a user interface 100 showing a conversation graph 102, in accordance with one or more implementations. The conversation graph 102 represents conversations within a set of communications (e.g., emails, text messages, recordings or transcripts of voice communications, etc.). The conversation graph 102 includes two or more nodes 104 and one or more edges 106 connecting pairs of the two or more nodes 104. A node represents an entity that includes, for example but without limitation, a person, a specific communication, or a domain name. The size of a node 104 varies based on the quantity of communications associated with the node 104. For example, a larger node 104 is associated with more communications than a smaller node 104.

An edge 106 connects a pair of nodes 104, and the edge 106 represents a flow of communication between the pair of nodes 104. The width of the edge 106 connecting the pair of nodes 104 represents a quantity of communications flowing between the pair of nodes 104. For example, a wider edge 106 represents more communications flowing than a narrower edge 106.

In some implementations, the conversation graph 102 emphasizes one or both of nodes 104 or edges 106 associated with more than a threshold quantity of communications. The conversation graph 102 deemphasizes or hides one or both of nodes 104 or edges 106 associated with less than a threshold quantity of communications.

Figure 1B:
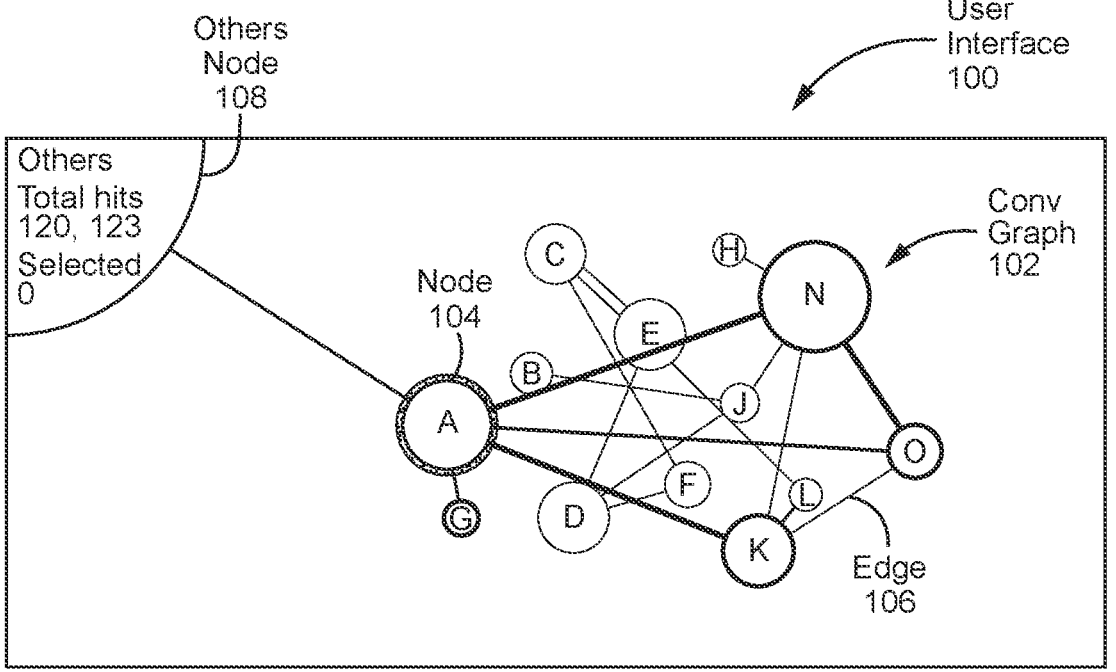
FIG. 1B illustrates an example view of the user interface of FIG. 1A showing an others node, in accordance with one or more implementations.

FIG. 1B illustrates an example view of the user interface 100 of FIG. 1A showing an others node 108, in accordance with one or more implementations. The others node 108 is connected to one or more other nodes 104 in the conversation graph 102. In some implementations, the others node 108 represents the communications of all of the entities not displayed as nodes through the user interface 100. For example, if the user interface 100 shows the top 50 nodes (by volume of communications, the others node represents all other nodes that are not in the top 50 nodes shown on the display. In this case, an edge 106 between any node 104 and the others node 108 represents the communications from that node 104 to all other nodes not shown on the user interface 100. As shown on the FIG. 1B, the others node also displays, in one implementation, the total number of documents represented by the others node 108, i.e., the documents that are not shown in any of the nodes 104 displays. In some implementations, the others node moves all of the most-likely non-important communications to outside of the communication graph 102, which streamlines processing needed to find important communications. In other implementations, the others node 108 depicts a node associated with communications that satisfy one or more other conditions. The one or more conditions also include, for example, one or more of having less than a threshold number of associated communications, having a communication date that falls outside of a timeframe, having an email domain, or other conditions.

Figure 1C:
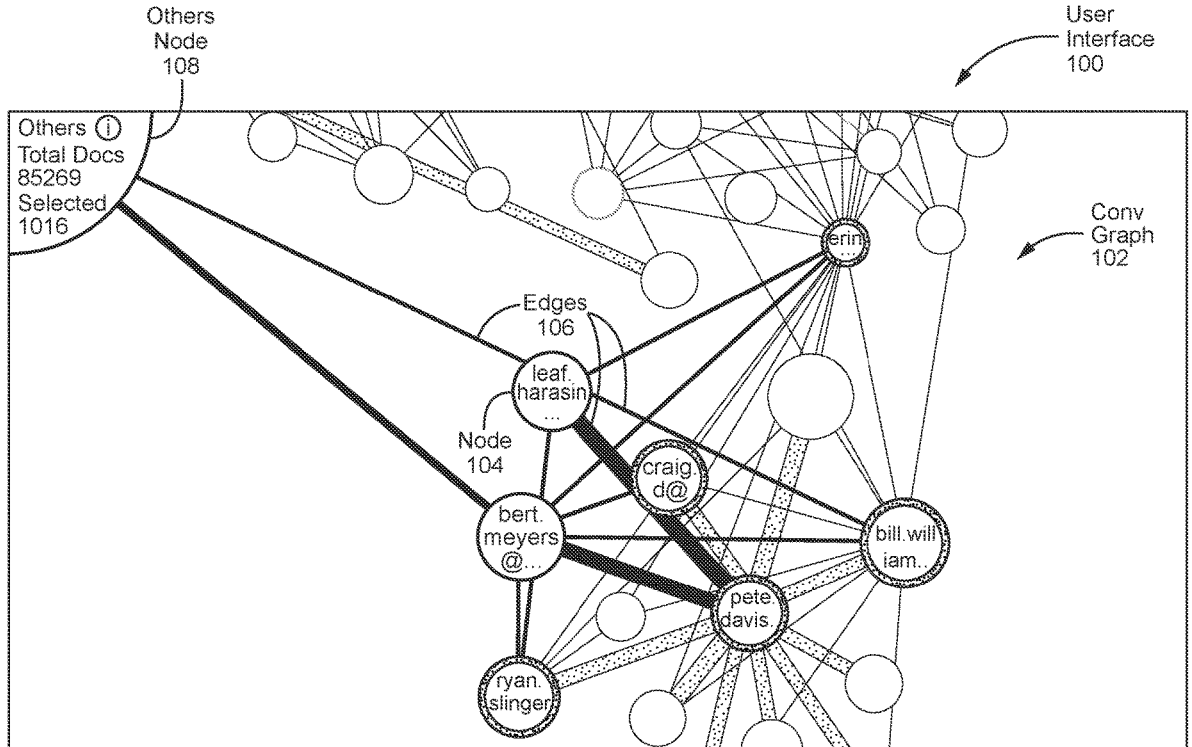
FIG. 1C illustrates a first example view of the user interface of FIG. 1A showing a node selection method, in accordance with one or more implementations.

FIG. 1C illustrates a first example view of the user interface 100 of FIG. 1A showing a node selection method, in accordance with one or more implementations. A user can select (e.g., through clicking or tapping) one or more nodes and one or more edges. The selected nodes and edges do not need to be adjacent or connected. The selected nodes do not need to be associated with the same communications. That is, a user is allowed to select and deselected any arbitrary node or edge regardless of its position in the conversation graph 102 or a selection status (i.e., selected or deselected) of any other nodes or edges. For example, in FIG. 1C, edges 106 are shown as being selected. Also, any number of edges or nodes are able to be selected.

Figure 1D:
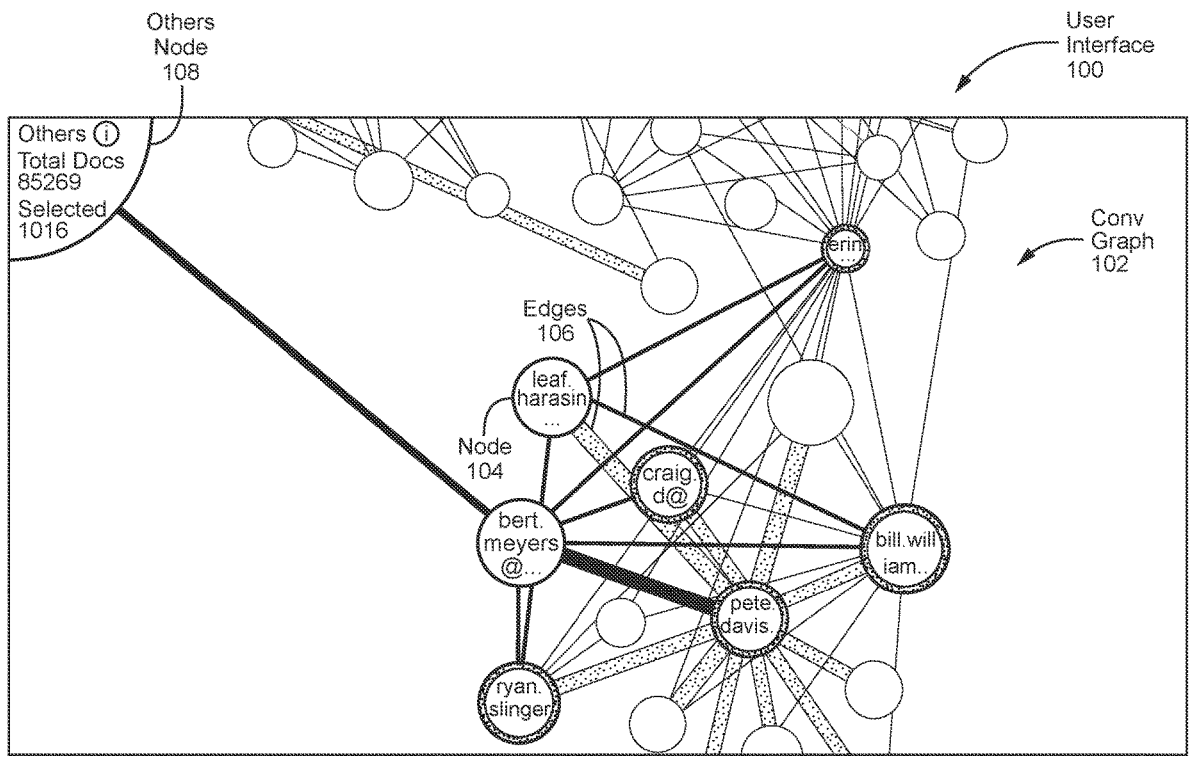
FIG. 1D illustrates a second example view of the user interface of FIG. 1A showing a node selection method, in accordance with one or more implementations.
Figure 1E:
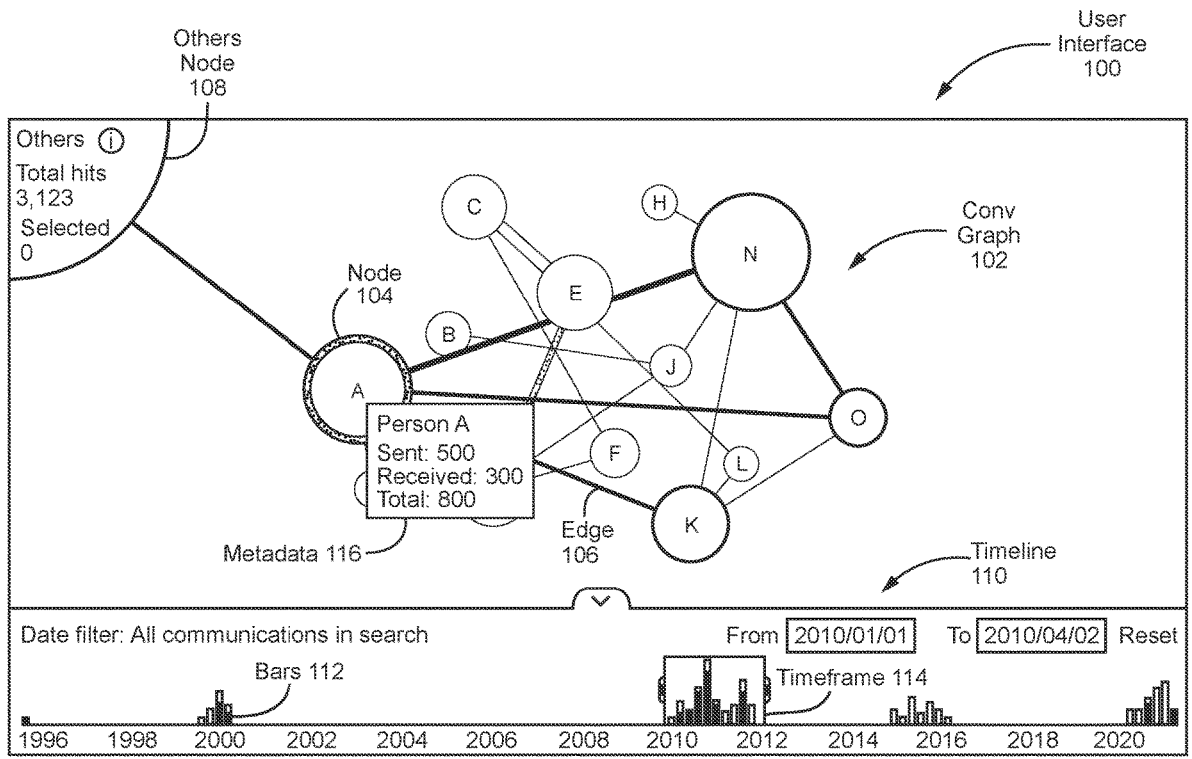
FIG. 1E illustrates an example view of the user interface of FIG. 1A showing a time range selection method, in accordance with one or more implementations.

FIG. 1D illustrates a second example view of the user interface 100 of FIG. 1A showing a node selection method, in accordance with one or more implementations. In FIG. 1D, the edges 106 are shown as being deselected. Deselected nodes 104 and edges 106 are shown as deemphasized relative to selected nodes and edges, or they are made absent from the conversation graph 102. In FIG. 1D, the edges 106 that were deselected are, in one implementation, individually selected to be toggled off (or on). The edges 106 shown, for example, are deselected even though the nodes 104 connecting them remain selected. Even though six nodes 104 are shown as selected, the user has deselected 3 of the edges between them FIG. 1E illustrates an example view of the user interface 100 of FIG. 1A showing a time range selection method, in accordance with one or more implementations. The user interface 100 includes a timeline 110 showing quantities of communications at different intervals (e.g., through heights of different bars 112) along the timeline 110 between a start date and an end date. A user is allowed to select one or more nodes 104 and/or one or more edges 106 through the user interface 100. One or more bars 112 are emphasized (e.g., made darker, etc.) on the timeline 110 that correspond to communications associated with the selected nodes/edges. Bars corresponding to communications associated with unselected nodes/edges are deemphasized (e.g., made lighter, grayed out, changed to dotted lines, etc.).

Still referring to FIG. 1E, according to some implementations, a user is allowed to select a timeframe 114 on the timeline 110. The timeframe 114 includes zero or more time intervals with communications (e.g., as indicated by different bars 112). Two or more nodes 104 and one or more edges 106 are emphasized (e.g., made darker, etc.) on the conversation graph 102 that correspond to communications at intervals within the timeframe 114. Nodes/edges that correspond to communications at intervals outside the timeframe 114 are deemphasized (e.g., made lighter, grayed out, changed to dotted lines, etc.). In some implementations, in response to a user selection of a node 104 or edge 106, metadata 116 of communications associated with the selected node/edge are displayed through user interface 100. For example, without limitation, the metadata 116 of the communications associated with the first node includes one or more of a person's name, a person's initials, a quantity of communications sent, a quantity of communications received, a total quantity of communications sent and received, a date or date range of communications, a domain name, or a communication subject or summary. In some implementations, users are able to show the time range for the others node (in addition to the regular time range of the displayed nodes). On the timeline 110 in FIG. 1E, the light bars are the others node time range, and the dark bars are the shown nodes time range.

Figure 1F:
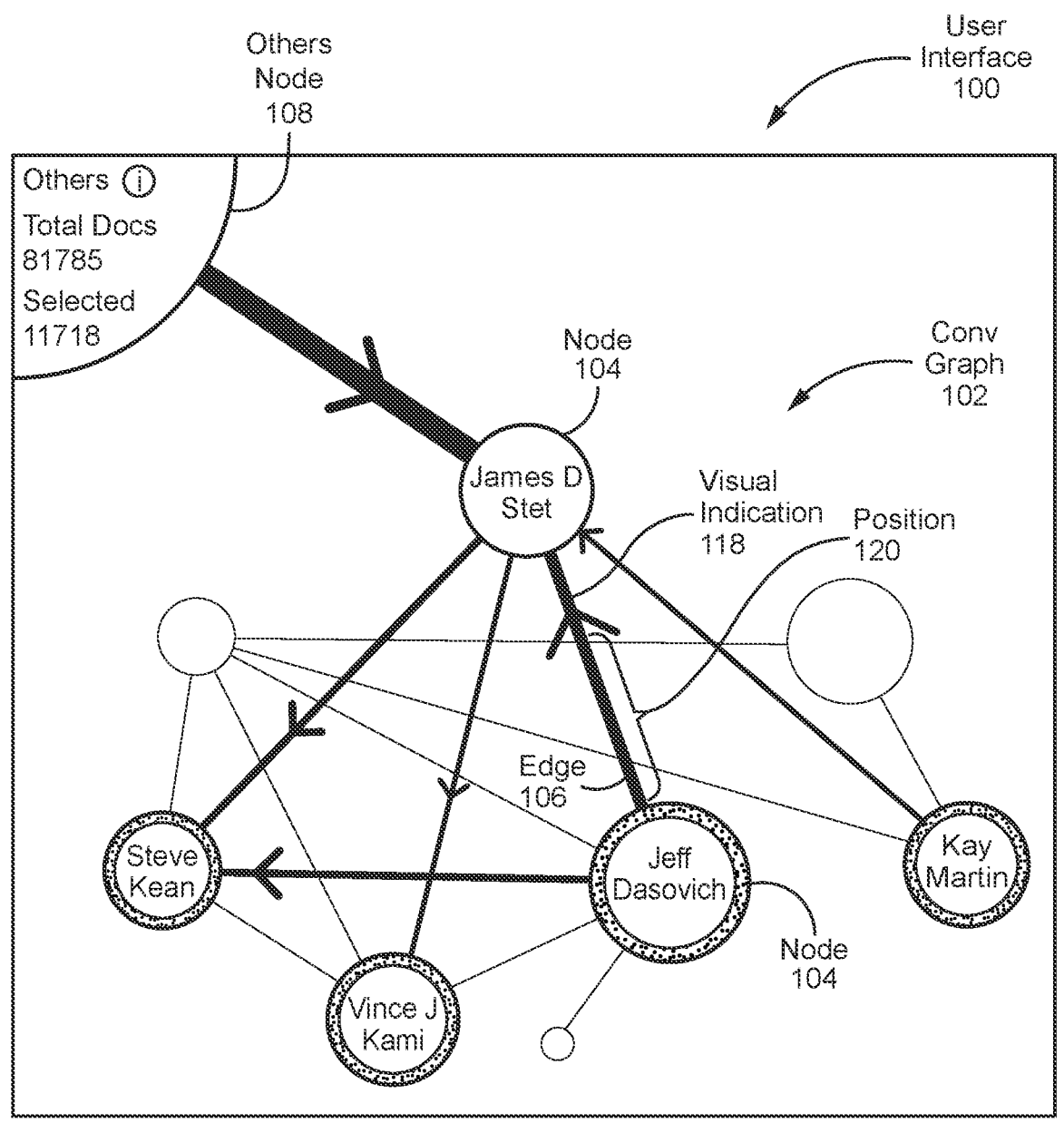
FIG. 1F illustrates an example view of the user interface of FIG. 1A showing node directionality, in accordance with one or more implementations.

FIG. 1F illustrates an example view of the user interface 100 of FIG. 1A showing node directionality, in accordance with one or more implementations. For each of the one or more edges 106 in the conversation graph 102, a quantity of communications flowing in each direction is determined between two nodes 104 connected by a edge 106. A proportionality of communications flowing in a first direction versus in a second direction between the two nodes 104 is determined. A visual indication 118 (e.g., an arrow shape) of directionality is shown on each of the one or more edges 106 in the conversation graph. The directionality conveys a direction of a majority of communications between the two nodes 104. For example, the arrow points in the direction of the majority of the communication. A position 120 of the visual indication 118 along the edge 106 is determined based on the proportionality of communications flowing in the first direction versus in the second direction between the two nodes 104. The closer to the node 104 that the visual indication 118 is, the higher the percentage of the communications between the two nodes is flowing towards that node 104. For example, if 99% of the communication was from a Node A to a Node B (not shown), the arrow (visual indication 118) would be pointed towards Node B and very close to Node B (position 120 would be almost the full length of the edge 106). If 51% of the communication from Node A to a Node B, the arrow (visual indication 118) would be pointed towards Node B but close to the center of the edge 106 between Nodes A and B (position 120 would be just over halfway between Node A and Node B—51% of the length of edge 106 between the two nodes A and B).

FIG. 2 illustrates a system 200 configured for providing conversation graphs, in accordance with one or more implementations. In some implementations, system 200 includes one or more computing systems 202. Computing system(s) 202 are configured to communicate with one or more remote platforms 204 according to a client/server architecture, a peer-to-peer architecture, or other architectures. Remote platform(s) 204 are configured to communicate with other remote platforms via computing system(s) 202 or according to a client/server architecture, a peer-to-peer architecture, or other architectures. Users access system 200 via remote platform(s) 204.

Computing system(s) 202 are configured by machine-readable instructions 206. Machine-readable instructions 206 includes one or more instruction modules. The instruction modules include computer program modules. The instruction modules include one or more of set receiving module 208, conversation graph determination module 210, display causing module 212, user interface providing module 214, user selection receiving module 216, bar emphasis module 218, bar deemphasizing module 220, node and edge emphasis module 222, node and edge deemphasizing module 224, quantity determination module 226, proportionality determination module 228, or other instruction modules.

Set receiving module 208 is configured to receive, by a processor, a set of communications. For example, the set of communications includes one or more of emails, text messages, or recordings or transcripts of voice communications.

Conversation graph determination module 210 is configured to determine, by the processor, a conversation graph representing conversations within the set of communications. The conversation graph includes two or more nodes and one or more edges connecting pairs of the two or more nodes. A node represents an entity. For example, the entity indicating one or more of a person, a specific communication, or a domain name. A size of the node represents a quantity of communications associated with the node. A larger node is associated with more communications than a smaller node. A edge connecting a pair of nodes represents a flow of communication between the pair of nodes. A width of the edge connecting the pair of nodes represents a quantity of communications flowing between the pair of nodes. A wider edge represents more communications flowing than a narrower edge. The conversation graph emphasizes one or both of nodes or edges associated with more than a threshold quantity of communications. The conversation graph deemphasizes one or both of nodes or edges associated with less than a threshold quantity of communications.

Display causing module 212 is configured to cause display of the conversation graph through a user interface (e.g., the user interface 100 in FIG. 1A).

User interface providing module 214 is configured to provide, through the user interface, an others node connected to one or more other nodes in the conversation graph. The others node includes a node associated with communications that satisfy one or more conditions. For example, the one or more conditions include one or more of having less than a threshold number of associated communications, having a communication date that falls outside of a timeframe, or having a email domain.

User interface providing module 214 is configured to, in response to the user selection of the first node or the first edge, provide, through the user interface, views of individual communications associated with the first node or the first edge. In some implementations, a view of an individual communication includes text from one or both of a subject or a body of the individual communication.

User interface providing module 214 is configured to, in response to the user selection of the first node or the first edge, provide, through the user interface, metadata of communications associated with the first node. For example, the metadata of the communications associated with the first node includes one or more of a person's name, a person's initials, a quantity of communications sent, a quantity of communications received, a total quantity of communications sent and received, a date or date range of communications, a domain name, or a communication subject or summary.

User selection receiving module 216 is configured to receive a user selection of a first node or a first edge through the user interface. For example, the user selection of the first node or the first edge includes one or more of a list selection, a search, a drag and drop, a click, a tap, or a gesture to the first node or the first edge. User selection receiving module 216 is configured to receive a user selection of a second node or a second edge through the user interface. The second node or the second edge is nonadjacent to the first node or the first edge. The second node or second edge and the first node or first edge is associated with different communications. User selection receiving module 216 is configured to receive a user selection of a third node or a third edge through the user interface. The third node or the third edge is nonadjacent to the second node or the second edge and is nonadjacent to the first node or the first edge. For example, the third node or the third edge, the second node or the second edge, and the first node or the first edge is associated with different communications.

User interface providing module 214 is configured to provide, through the user interface, a timeline showing quantities of communications at different intervals along the timeline between a start date and an end date. In some implementations, for example, an interval includes one or more of a year, a month, a week, a day, an hour, a minute, or a second.

User selection receiving module 216 is configured to receive a user selection of a first timeframe on the timeline. For example, the user selection of the first timeframe includes one or more of a list selection, a search, a drag and drop, a click, a tap, or a gesture to the first node or the first edge. The first timeframe includes one or more intervals with communications. The others node represents the communications of all of the nodes not displayed through the user interface.

Bar emphasis module 218 is configured to, in response to the user selection of the first node or the first edge, emphasize one or more bars on the timeline that correspond to communications associated with the first node or the first edge. Bar emphasis module 218 is configured to, in response to the user selection of the first timeframe on the timeline, emphasize one or more bars on the timeline that correspond to communications at the one or more intervals within the first timeframe.

Bar deemphasizing module 220 is configured to, in response to the user selection of the first node or the first edge, deemphasize one or more bars on the timeline that correspond to communications associated with one or more nodes or edges other than the first node or the first edge. Bar deemphasizing module 220 is configured to, in response to the user selection of the first timeframe on the timeline, deemphasize one or more bars on the timeline that correspond to communications at intervals outside the first timeframe.

Node and edge emphasis module 222 is configured to, in response to the user selection of the first timeframe on the timeline, emphasize two or more nodes and one or more edges on the conversation graph that correspond to communications at the one or more intervals within the first timeframe.

Node and edge deemphasizing module 224 is configured to, in response to the user selection of the first timeframe on the timeline, deemphasize nodes and edges on the conversation graph that correspond to communications at intervals outside the first timeframe.

Quantity determination module 226 is configured to, for each of the one or more edges in the conversation graph, determine a quantity of communications flowing in each direction between two nodes connected by a edge.

Proportionality determination module 228 is configured to determine a proportionality of communications flowing in a first direction versus in a second direction between the two nodes.

User interface providing module 214 is configured to provide, through the user interface, a visual indication of directionality on each of the one or more edges in the conversation graph. The visual indication includes an arrow shape pointing in the direction of the majority of the communications between the two nodes. A position of the visual indication along the edge is determined based on the proportionality of communications flowing the first direction versus in the second direction between the two nodes. The directionality conveys a direction of a majority of communications between the two nodes.

In some implementations, computing system(s) 202, remote platform(s) 204, or external resources 230 is operatively linked via one or more electronic communication links. For example, such electronic communication links is established, at least in part, via a network such as the Internet or other networks. It will be appreciated that this is not intended to be limiting, and that the scope of this disclosure includes implementations in which computing system(s) 202, remote platform(s) 204, or external resources 230 is operatively linked via some other communication media.

A given remote platform 204 includes one or more processors configured to execute computer program modules. The computer program modules is configured to enable an expert or user associated with the given remote platform 204 to interface with system 200 or external resources 230, or provide other functionality attributed herein to remote platform(s) 204. For example, a given remote platform 204 or a given computing system 202 includes one or more of a server, a desktop computer, a laptop computer, a handheld computer, a tablet computing system, a NetBook, a Smartphone, a gaming console, or other computing systems.

External resources 230 includes sources of information outside of system 200, external entities participating with system 200, or other resources. In some implementations, some or all of the functionality attributed herein to external resources 230 is provided by resources included in system 200.

Computing system(s) 202 includes electronic storage 232, one or more processors 234, or other components. Computing system(s) 202 includes communication lines, or ports to enable the exchange of information with a network or other computing systems. Illustration of computing system(s) 202 in FIG. 2 is not intended to be limiting. Computing system(s) 202 includes a plurality of hardware, software, or firmware components operating together to provide the functionality attributed herein to computing system(s) 202. For example, computing system(s) 202 is implemented by a cloud of computing systems operating together as computing system(s) 202.

Electronic storage 232 comprises non-transitory storage media that electronically stores information. The electronic storage media of electronic storage 232 includes one or both of system storage that is provided integrally (i.e., substantially non-removable) with computing system(s) 202 or removable storage that is removably connectable to computing system(s) 202 via, for example, a port (e.g., a USB port, a firewire port, etc.) or a drive (e.g., a disk drive, etc.). Electronic storage 232 includes one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. Electronic storage 232 includes one or more virtual storage resources (e.g., cloud storage, a virtual private network, or other virtual storage resources). Electronic storage 232 stores software algorithms, information determined by processor(s) 234, information received from computing system(s) 202, information received from remote platform(s) 204, or other information that enables computing system(s) 202 to function as described herein.

Processor(s) 234 is configured to provide information processing capabilities in computing system(s) 202. As such, processor(s) 234 includes one or more of a digital processor, an analog processor, a digital circuit designed to process information, an analog circuit designed to process information, a state machine, or other mechanisms for electronically processing information. Although processor(s) 234 is shown in FIG. 2 as a single entity, this is for illustrative purposes only. In some implementations, processor(s) 234 includes a plurality of processing units. These processing units is physically located within the same device, or processor(s) 234 represents processing functionality of a plurality of devices operating in coordination. Processor(s) 234 is configured to execute modules 208, 210, 212, 214, 216, 218, 220, 222, 224, 226, or 228, or other modules. Processor(s) 234 is configured to execute modules 208, 210, 212, 214, 216, 218, 220, 222, 224, 226, or 228, or other modules by software; hardware; firmware; some combination of software, hardware, or firmware; or other mechanisms for configuring processing capabilities on processor(s) 234. As used herein, the term "module" refers to any component or set of components that perform the functionality attributed to the module. This includes one or more physical processors during execution of processor readable instructions, the processor readable instructions, circuitry, hardware, storage media, or any other components.

It should be appreciated that although modules 208, 210, 212, 214, 216, 218, 220, 222, 224, 226, or 228 are illustrated in FIG. 2 as being implemented within a single processing unit, in implementations in which processor(s) 234 includes multiple processing units, one or more of modules 208, 210, 212, 214, 216, 218, 220, 222, 224, 226, or 228 is implemented remotely from the other modules. The description of the functionality provided by the different modules 208, 210, 212, 214, 216, 218, 220, 222, 224, 226, or 228 described below is for illustrative purposes, and is not intended to be limiting, as any of modules 208, 210, 212, 214, 216, 218, 220, 222, 224, 226, or 228 provides more or less functionality than is described. For example, one or more of modules 208, 210, 212, 214, 216, 218, 220, 222, 224, 226, or 228 is eliminated, and some or all of its functionality is provided by other ones of modules 208, 210, 212, 214, 216, 218, 220, 222, 224, 226, or 228. As another example, processor(s) 234 is configured to execute one or more additional modules that performs some or all of the functionality attributed below to one of modules 208, 210, 212, 214, 216, 218, 220, 222, 224, 226, or 228.

Figure 3:
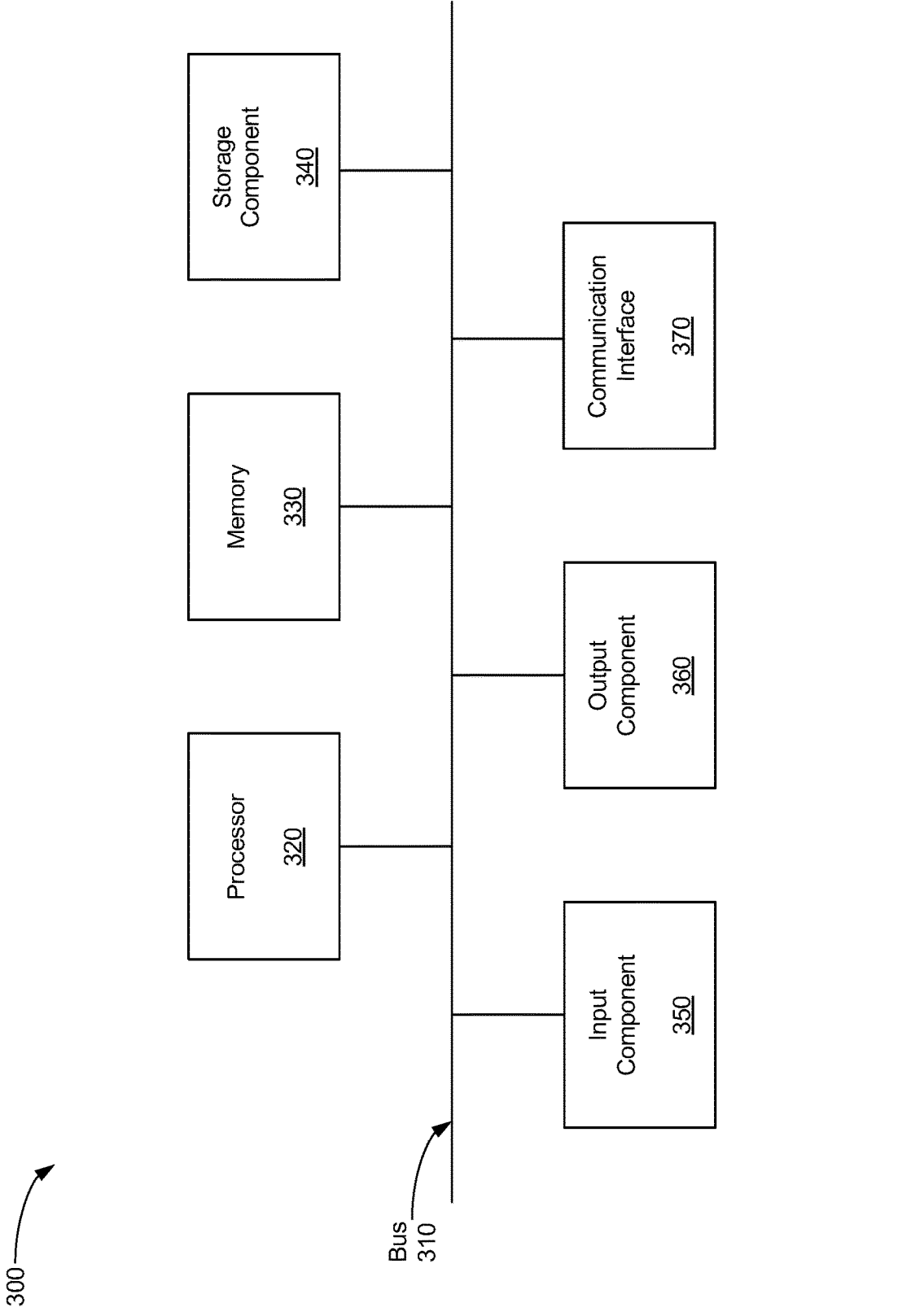
FIG. 3 illustrates an example computer system to implement the processes.

FIG. 3 is a diagram of example components of a device 300, which corresponds to one or more of computing system(s) 202, remote platform(s) 204, or other device(s) described herein. In some implementations, computing system(s) 202, remote platform(s) 204, or other devices described herein include one or more devices 300 or one or more components of device 300. As shown in FIG. 3, device 300 includes a bus 310, a processor 320, a memory 330, an input component 340, an output component 350, and a communication component 360.

Bus 310 includes one or more components that enable wired or wireless communication among the components of device 300. Bus 310 couples together two or more components of FIG. 3, such as via operative coupling, communicative coupling, electronic coupling, or electric coupling. Processor 320 includes a central processing unit, a graphics processing unit, a microprocessor, a controller, a microcontroller, a digital signal processor, a field-programmable gate array, an application-specific integrated circuit, or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile or nonvolatile memory. For example, memory 330 includes random access memory (RAM), read-only memory (ROM), a hard disk drive, or another type of memory (e.g., a flash memory, a magnetic memory, or an optical memory). Memory 330 includes internal memory (e.g., RAM, ROM, or a hard disk drive) or removable memory (e.g., removable via a universal serial bus connection). Memory 330 is a non-transitory computer-readable medium. Memory 330 stores information, instructions, or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input or sensed input. For example, input component 340 includes a touch screen, a keyboard, a keypad, a mouse, a button, a microphone, a switch, a sensor, a global positioning system sensor, an accelerometer, a gyroscope, or an actuator. Output component 350 enables device 300 to provide output, such as via a display, a speaker, or a light-emitting diode. Communication component 360 enables device 300 to communicate with other devices via a wired connection or a wireless connection. For example, communication component 360 includes a receiver, a transmitter, a transceiver, a modem, a network interface card, or an antenna.

Device 300 performs one or more operations or processes described herein. For example, a non-transitory computer-readable medium (e.g., memory 330) stores a set of instructions (e.g., one or more instructions or code) for execution by processor 320. Processor 320 executes the set of instructions to perform one or more operations or processes described herein. In some implementations, execution of the set of instructions, by one or more processors 320, causes the one or more processors 320 or the device 300 to perform one or more operations or processes described herein. In some implementations, hardwired circuitry is used instead of or in combination with the instructions to perform one or more operations or processes described herein. Additionally, or alternatively, processor 320 is configured to perform one or more operations or processes described herein. Thus, implementations described herein are not limited to any specific combination of hardware circuitry and software.

The number and arrangement of components shown in FIG. 3 are provided as an example. Device 300 includes additional components, fewer components, different components, or differently arranged components than those shown in FIG. 3. Additionally, or alternatively, a set of components (e.g., one or more components) of device 300 performs one or more functions described as being performed by another set of components of device 300.

Figure 4A:
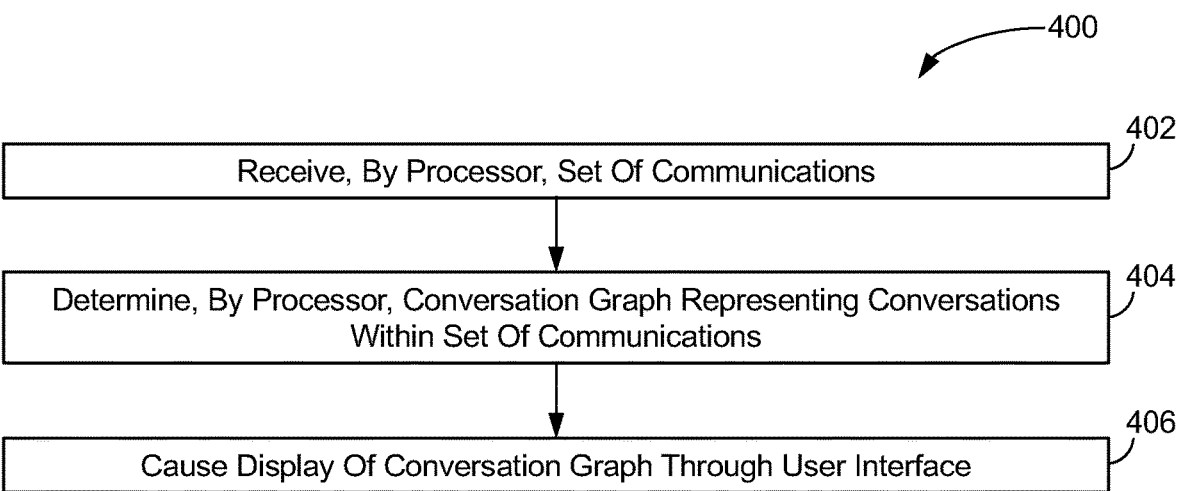
FIG. 4A is a flow chart of an example process for providing conversation graphs, in accordance with one or more implementations.

FIG. 4A is a flow chart of an example method 400 in a data processing system for providing conversation graphs, in accordance with one or more implementations. In some implementations, one or more steps of FIG. 4A is performed by a device including one or more of computing system(s) 202, remote platform(s) 204, or other devices. In some implementations, one or more steps of FIG. 4A is performed by another device or a group of devices separate from or including the device.

As shown at step 402, method 400 includes receiving, by a processor, a set of communications. For example, the device performs receiving, by a processor, a set of communications, as described above.

As shown at step 404, method 400 includes determining, by the processor, a conversation graph representing conversations within the set of communications. The conversation graph includes two or more nodes and one or more edges connecting pairs of the two or more nodes. A given node represents an entity. The entity indicating one or more of a person, a specific communication, or a domain name. A given edge connecting a given pair of nodes represents a flow of communication between the given pair of nodes. For example, the device performs determining, by the processor, a conversation graph representing conversations within the set of communications. The conversation graph includes two or more nodes and one or more edges connecting pairs of the two or more nodes. A given node represents an entity. The entity indicating one or more of a person, a specific communication, or a domain name. A given edge connecting a given pair of nodes represents a flow of communication between the given pair of nodes, as described above.

As shown at step 406, method 400 includes causing display of the conversation graph through a user interface. For example, the device performs causing display of the conversation graph through a user interface, as described above.

FIG. 4B shows one or more additional steps corresponding the steps shown in FIG. 4A, in which an others node is provided, in accordance with one or more implementations. As shown at step 408, method 400 includes providing, through the user interface, an others node connected to one or more other nodes in the conversation graph. The others node includes a node associated with communications that satisfy one or more conditions. For example, the device performs providing, through the user interface, an others node connected to one or more other nodes in the conversation graph. In some implementations, the others node represents the communications of all of the nodes not displayed through the user interface.

FIG. 4C shows one or more additional steps corresponding the steps shown in FIG. 4A, in which node selection is performed, in accordance with one or more implementations. As shown at step 410, method 400 includes receiving a user selection of a first node or a first edge through the user interface. For example, the device performs receiving a user selection of a first node or a first edge through the user interface, as described above.

As shown at step 412, method 400 includes receiving a user selection of a second node or a second edge through the user interface. The second node or second edge and the first node or first edge is associated with different communications. For example, the device performs receiving a user selection of a second node or a second edge through the user interface. The second node or second edge and the first node or first edge is associated with different communications, as described above.

As shown at step 414, method 400 includes receiving a user selection of a third node or a third edge through the user interface. The third node or the third edge, the second node or the second edge, and the first node or the first edge is associated with different communications. For example, the device performs receiving a user selection of a third node or a third edge through the user interface. The third node or the third edge, the second node or the second edge, and the first node or the first edge is associated with different communications, as described above.

As shown at step 416, method 400 includes in response to the user selection of the first node or the first edge, providing, through the user interface, metadata of communications associated with the first node. For example, the device performs in response to the user selection of the first node or the first edge, providing, through the user interface, metadata of communications associated with the first node, as described above.

As shown at step 418, method 400 includes in response to the user selection of the first node or the first edge, providing, through the user interface, views of individual communications associated with the first node or the first edge. For example, the device performs in response to the user selection of the first node or the first edge, providing, through the user interface, views of individual communications associated with the first node or the first edge, as described above.

FIG. 4D shows one or more additional steps corresponding the steps shown in FIG. 4A, in which time range selection is performed, in accordance with one or more implementations. As shown at step 420, method 400 includes providing, through the user interface, a timeline showing quantities of communications at different intervals along the timeline between a start date and an end date. For example, the device performs providing, through the user interface, a timeline showing quantities of communications at different intervals along the timeline between a start date and an end date, as described above.

As shown at step 422, method 400 includes receiving a user selection of a first node or a first edge through the user interface. For example, the device performs receiving a user selection of a first node or a first edge through the user interface, as described above.

As shown at step 424, method 400 includes in response to the user selection of the first node or the first edge, emphasizing one or more bars on the timeline that correspond to communications associated with the first node or the first edge. For example, the device performs in response to the user selection of the first node or the first edge, emphasizing one or more bars on the timeline that correspond to communications associated with the first node or the first edge, as described above.

As shown at step 426, method 400 includes in response to the user selection of the first node or the first edge, deemphasizing one or more bars on the timeline that correspond to communications associated with one or more nodes or edges other than the first node or the first edge. For example, the device performs in response to the user selection of the first node or the first edge, deemphasizing one or more bars on the timeline that correspond to communications associated with one or more nodes or edges other than the first node or the first edge, as described above.

As shown at step 428, method 400 includes receiving a user selection of a first timeframe on the timeline. The first timeframe includes one or more intervals with communications. For example, the device performs receiving a user selection of a first timeframe on the timeline. The first timeframe includes one or more intervals with communications, as described above.

As shown at step 430, method 400 includes in response to the user selection of the first timeframe on the timeline, emphasizing two or more nodes and one or more edges on the conversation graph that correspond to communications at the one or more intervals within the first timeframe. For example, the device performs in response to the user selection of the first timeframe on the timeline, emphasizing two or more nodes and one or more edges on the conversation graph that correspond to communications at the one or more intervals within the first timeframe, as described above.

As shown at step 432, method 400 includes in response to the user selection of the first timeframe on the timeline, emphasizing one or more bars on the timeline that correspond to communications at the one or more intervals within the first timeframe. For example, the device performs in response to the user selection of the first timeframe on the timeline, emphasizing one or more bars on the timeline that correspond to communications at the one or more intervals within the first timeframe, as described above.

As shown at step 434, method 400 includes in response to the user selection of the first timeframe on the timeline, deemphasizing nodes and edges on the conversation graph that correspond to communications at intervals outside the first timeframe. For example, the device performs in response to the user selection of the first timeframe on the timeline, deemphasizing nodes and edges on the conversation graph that correspond to communications at intervals outside the first timeframe, as described above.

As shown at step 436, method 400 includes in response to the user selection of the first timeframe on the timeline, deemphasizing one or more bars on the timeline that correspond to communications at intervals outside the first timeframe. For example, the device performs in response to the user selection of the first timeframe on the timeline, deemphasizing one or more bars on the timeline that correspond to communications at intervals outside the first timeframe, as described above.

FIG. 4E shows additional one or more steps corresponding the steps shown in FIG. 4A, in which node directionality is provided, in accordance with one or more implementations. As shown at step 438, method 400 includes for each of the one or more edges in the conversation graph, determining a quantity of communications flowing in each direction between two nodes connected by a given edge. For example, the device performs for each of the one or more edges in the conversation graph, determining a quantity of communications flowing in each direction between two nodes connected by a given edge, as described above.

As shown at step 440, method 400 includes determining a proportionality of communications flowing in a first direction versus in a second direction between the two nodes. For example, the device performs determining a proportionality of communications flowing in a first direction versus in a second direction between the two nodes, as described above.

As shown at step 442, method 400 includes providing, through the user interface, a visual indication of directionality on each of the one or more edges in the conversation graph. The directionality conveys a direction of a majority of communications between the two nodes. For example, the device performs providing, through the user interface, a visual indication of directionality on each of the one or more edges in the conversation graph. The directionality conveys a direction of a majority of communications between the two nodes, as described above.

Method 400 includes additional implementations, such as any single implementation or any combination of implementations described herein or in connection with one or more other processes described elsewhere herein.

Although FIG. 4A, FIG. 4B, FIG. 4C, FIG. 4D, or FIG. 4E shows example steps of method 400, in some implementations, method 400 includes additional steps, fewer steps, different steps, or differently arranged steps than those depicted in FIG. 4A, FIG. 4B, FIG. 4C, FIG. 4D, or FIG. 4E. Additionally, or alternatively, two or more of the steps of method 400 is performed in parallel.

The foregoing disclosure and accompanying drawings are not intended to be exhaustive or to limit the implementations to the precise form disclosed and illustrated. Modifications and variations are made in light of the above disclosure or are acquired from practice of the implementations.

As used herein, the term "component" is intended to be broadly construed as hardware, firmware, or a combination of hardware and software.

It will be apparent that systems or methods described herein are implemented in different forms of hardware, firmware, or a combination of hardware and software. The actual specialized control hardware or software code used to implement these systems or methods is not limiting of the implementations. Thus, the operation and behavior of the systems or methods are described herein without reference to specific software code-it being understood that software and hardware can be designed to implement the systems or methods based on the description herein.

Even though particular combinations of features are recited in the claims or disclosed in the specification, these combinations are not intended to limit the disclosure of various implementations. In fact, many of these features is combined in ways not specifically recited in the claims or disclosed in the specification. Although each dependent claim listed below directly depends on only one claim, the disclosure of various implementations includes each dependent claim in combination with every other claim in the claim set.

What is claimed is:

1. A method comprising:

receiving, by a computing device, a set of communications;

determining, by the computing device, a conversation graph representing conversations within the set of communications, the conversation graph including two or more nodes and one or more edges connecting pairs of the two or more nodes, wherein each given node represents a respective entity indicating one or more of a person or a domain name, and wherein a given edge connecting a given pair of nodes represents a flow of communication between the respective entities;

determining, based on first criteria, displayed nodes and non-displayed nodes in the conversation graph, the displayed nodes each having a quantity of communications that is equal to or more than a threshold quantity of communications, and the non-displayed nodes each having a quantity of communications that is less than the threshold quantity of communications;

causing display of the conversation graph comprising the displayed nodes and an others node through a user interface, wherein the others node represents the non-displayed nodes;

causing display of a timeline showing the set of communications associated with the displayed nodes and the other node;

receiving, from a user device, a user selection of second criteria associated with one or more displayed nodes, the second criteria comprising a timeframe received via the timeline;

determining, based on the second criteria, a first subset of displayed nodes falling within the timeframe and a second subset of displayed nodes falling outside the timeframe; and causing display, in response to the user selection and through the user interface, of the first subset of displayed nodes as emphasized nodes and the second subset of displayed nodes as deemphasized nodes.

2. The method of claim 1, wherein the set of communications includes one or more of emails, text messages, recordings, or transcripts of voice communications.

3. The method of claim 1, wherein the timeline comprises one or more bars that correspond to a quantity of communications associated with the displayed nodes in a particular timeframe, and one or more bars that correspond to a quantity of communications associated with the others node in the particular timeframe.

4. The method of claim 1, further comprising:

receiving, via the user interface, a user selection of a given email domain; and updating the emphasized nodes and deemphasized nodes based on the given email domain.

5. The method of claim 1, wherein a size of the given node represents a quantity of communications associated with the given node, and wherein a width of the given edge connecting the given pair of nodes represents a quantity of communications flowing between the given pair of nodes.

6. The method of claim 1, further comprising:

receiving, via the user interface, a user selection of one or more displayed nodes; and causing display, through the user interface and in response to the user selection of the one or more displayed nodes, of metadata associated with the selected one or more displayed nodes.

7. A computing system comprising:

a memory comprising executable instructions embodied thereon; and one or more hardware processors configured to execute the instructions to:

receive a set of communications;

determine a conversation graph representing conversations within the set of communications, the conversation graph including two or more nodes and one or more edges connecting pairs of the two or more nodes, wherein each given node represents a respective entity indicating one or more of a person or a domain name, and wherein a given edge connecting a given pair of nodes represents a flow of communication between the respective entities;

determine, based on first criteria, displayed nodes and non-displayed nodes in the conversation graph, the displayed nodes each having a quantity of communications that is equal to or more than a threshold quantity of communications, and the non-displayed nodes each having a quantity of communications that is less than the threshold quantity of communications;

cause display of the conversation graph comprising the displayed nodes and an others node through a user interface, wherein the others node represents the non-displayed nodes;

cause display of a timeline showing the set of communications associated with the displayed nodes and the other node;

receive, from a user device, a user selection of a second criteria associated with one or more displayed nodes, the second criteria comprising a timeframe received via the timeline;

determine, based on the second criteria, a first subset of displayed nodes as emphasized nodes and a second subset of displayed nodes as de-emphasized nodes; and cause display, in response to the user selection and through the user interface, of the first subset of displayed nodes as emphasized nodes and the second subset of displayed nodes as deemphasized nodes.

8. The computing system of claim 7, wherein the set of communications includes one or more of emails, text messages, or recordings or transcripts of voice communications.

9. The computing system of claim 7, wherein the timeline comprises one or more bars that correspond to a quantity of communications associated with the displayed nodes in a particular timeframe, and one or more bars that correspond to a quantity of communications associated with the others node in the particular timeframe.

10. The computing system of claim 7, wherein the one or more hardware processors are further configured to execute the instructions to:

receive, via the user interface, a user selection of a given email domain; and update the emphasized nodes and deemphasized nodes based on the given email domain.

11. The computing system of claim 7, wherein a size of the given node represents a quantity of communications associated with the given node, and wherein a width of the given edge connecting the given pair of nodes represents a quantity of communications flowing between the given pair of nodes.

12. A method in a data processing system for providing conversation graphs, the method comprising:

receiving, by a computing device, a set of communications;

determining, by the computing device, a conversation graph representing conversations within the set of communications, the conversation graph including two or more nodes and one or more edges connecting pairs of the two or more nodes, wherein each given node represents a respective entity indicating one or more of a person, or a domain name, and wherein a given edge connecting a given pair of nodes represents a flow of communication between the respective entities;

determining, based on first criteria, displayed nodes and non-displayed nodes in the conversation graph, the displayed nodes each having a quantity of communications that is equal to or more than a threshold quantity of communications, and the non-displayed nodes each having a quantity of communications that is less than the threshold quantity of communications; causing display of the conversation graph comprising the displayed nodes and an others node through a user interface, wherein the others node represents the non-displayed nodes;

causing display of a timeline showing the set of communications associated with the displayed nodes and the other node;

receiving a user selection of a first node or a first edge through the user interface;

receiving a user selection of a second node or a second edge through the user interface, wherein the second node or second edge and the first node or first edge are associated with different communications, wherein the second node or the second edge is nonadjacent to the first node or the first edge;

determine, based on the user selection of the first and second nodes, the first node and the second node as emphasized nodes and remaining displayed nodes as de-emphasized nodes; and causing display, through the user interface, of the emphasized nodes and the de-emphasized nodes in the conversation graph.

13. The method of claim 12, wherein the user selection of the first node or the first edge includes one or more of a list selection, a search, a drag and drop, a click, a tap, or a gesture to the first node or the first edge.

14. The method of claim 12, further comprising:

receiving a user selection of a third node or a third edge through the user interface, wherein the third node or the third edge, the second node or the second edge, and the first node or the first edge are associated with different communications, wherein the third node or the third edge is nonadjacent to the second node or the second edge and is nonadjacent to the first node or the first edge.

15. The method of claim 12, further comprising:

in response to the user selection of the first node or the first edge, providing, through the user interface, metadata of communications associated with the first node; and in response to the user selection of the first node or the first edge, providing, through the user interface, views of individual communications associated with the first node or the first edge.

16. The method of claim 15, wherein the metadata of the communications associated with the first node includes one or more of a person's name, a person's initials, a quantity of communications sent, a quantity of communications received, a total quantity of communications sent and received, a date or date range of communications, a particular domain name, or a communication subject or summary.

17. A computing system comprising:

a memory comprising executable instructions embodied thereon; and one or more hardware processors configured to execute the instructions to:

receive, by a processor, a set of communications;

determine, by the processor, a conversation graph representing conversations within the set of communications, the conversation graph including two or more nodes and one or more edges connecting pairs of the two or more nodes, wherein each given node represents a respective entity indicating one or more of a person, or a domain name, and wherein a given edge connecting a given pair of nodes represents a flow of communication between the respective entities;

determine, based on first criteria, displayed nodes and non-displayed nodes in the conversation graph, the displayed nodes each having a quantity of communications that is equal to or more than a threshold quantity of communications, and the non-displayed nodes each having a quantity of communications that is less than the threshold quantity of communications;

cause display of the conversation graph comprising the displayed nodes and an others node through a user interface, wherein the others node represents the non-displayed nodes;

cause display of a timeline showing the set of communications associated with the displayed nodes and the other node;

receive a user selection of a first node or a first edge through the user interface; and receive a user selection of a second node or a second edge through the user interface, wherein the second node or second edge and the first node or first edge are associated with different communications, wherein the second node or the second edge is nonadjacent to the first node or the first edge;

determine, by the processor and based on the user selection of the first and second nodes, the first node and the second node as emphasized nodes and remaining displayed nodes as de-emphasized nodes; and cause display, by the processor and through the user interface, of the emphasized nodes and the de-emphasized nodes in the conversation graph.

18. The computing system of claim 17, wherein the user selection of the first node or the first edge includes one or more of a list selection, a search, a drag and drop, a click, a tap, or a gesture to the first node or the first edge.

19. The computing system of claim 18, wherein the one or more hardware processors are further configured to execute the instructions to:

receive a user selection of a third node or a third edge through the user interface, wherein the third node or the third edge, the second node or the second edge, and the first node or the first edge are associated with different communications, wherein the third node or the third edge is nonadjacent to the second node or the second edge and is nonadjacent to the first node or the first edge.

20. The computing system of claim 17, wherein the one or more hardware processors are further configured to execute the instructions to:

in response to the user selection of the first node or the first edge, provide, through the user interface, metadata of communications associated with the first node; and in response to the user selection of the first node or the first edge, provide, through the user interface, views of individual communications associated with the first node or the first edge.

21. The computing system of claim 20, wherein the metadata of the communications associated with the first node includes one or more of a person's name, a person's initials, a quantity of communications sent, a quantity of communications received, a total quantity of communications sent and received, a date or date range of communications, a particular domain name, or a communication subject or summary.

* * * * *